3,125,588
**SELECTIVE HYDROGENATION PREGNADIEN-
OLONE AND ITS ESTERS AT THE $C_{16}$—$C_{17}$
POSITION**
Peter Edward Macey and Peter Oxley, Nottingham, England, assignors to Boots Pure Drug Company Limited, Nottingham, England, a British company
No Drawing. Filed Oct. 15, 1962, Ser. No. 230,682
Claims priority, application Great Britain Oct. 31, 1961
6 Claims. (Cl. 260—397.4)

This invention relates to the hydrogenation of steroids. In particular it relates to the selective hydrogenation of steroids containing a $\Delta^5$ double bond.

A number of stages in various processes for producing corticosteroids use intermediates containing a $\Delta^5$ double bond requiring hydrogenation at $C_{16}$ and $C_{17}$. Included among such intermediates are $\Delta^{5,16}$-pregnadien-3-beta-ol-20-one and its esters such as pregnadienolone acetate. These hydrogenations are usually controlled by periodic checking at short intervals of the amount of hydrogen absorbed and ceasing to hydrogenate when the required volume of hydrogen has been absorbed. Not only is continuous supervision of the reaction necessitated but the product of hydrogenation needs careful purification from by-products which are produced by a certain degree of hydrogenation at other groups which are less easily reduced.

We have now discovered that when such compounds containing a $\Delta^5$ double bond are hydrogenated in solution in benzene or toluene, either with or without the addition of a secondary solvent, hydrogenation proceeds to completion at $C_{16}$ and $C_{17}$ without simultaneous attack at the $\Delta^5$ double bond.

According to the present invention there is provided a process for the selective hydrogenation of steroids at the $C_{16}$—$C_{17}$ position whereby a $\Delta^{5,16}$ steroid is hydrogenated in the presence of benzene or toluene.

The starting material may be any $\Delta^{5,16}$ steroid which is otherwise stable under the conditions of the hydrogenation but the reaction is particularly applicable to pregnadienes.

The starting material may be dissolved in pure benzene or toluene in which solubility is excellent. It is not necessary, however, to employ a single solvent and mixtures may be found to be advantageous. For example, we have found that an excellent product may be recovered from the reduction of pregnadienolone acetate in a mixture of ethyl acetate and toluene. The speed of hydrogenation is faster than with toluene alone but more solvent has to be used because of the lower solubility of pregnadienolone acetate in ethyl acetate.

Hydrogenation according to the invention may be carried out at atmospheric pressure or at higher pressures. In the laboratory using glass apparatus atmospheric pressures are generally used but on the larger scale we have found that higher pressures give rapid, efficient hydrogenations. We normally hydrogenate at pressures up to 50 lb./sq. in., preferably at about 30 lb./sq. in.

The temperature of hydrogenation is not critical and may vary considerably. We normally hydrogenate at or slightly higher than room temperature but owing to the reaction being exothermic, a final temperature of 50–55° C. is reached during hydrogenation under pressure.

The catalyst may be palladium on a suitable carrier such as alumina, barium sulphate, zinc oxide or charcoal. We have found that 5% palladised alumina gives very satisfactory results and that 100 g. of steroid may be efficiently hydrogenated using 1–10 g. of catalyst. It is highly important, as with all catalytic reactions of this nature that the solvents used in the reaction be of high purity and free of compounds containing elements such as sulphur which might poison the catalyst and inhibit the hydrogenation.

The following non-limiting examples illustrate the invention.

*Example 1*

Pregnadienolone acetate (10 g.) dissolved in toluene (50 ml.) was hydrogenated in a shaken glass hydrogenator at atmospheric temperature and pressure in the presence of 1 g. of 5% palladised alumina. The uptake of hydrogen was measured at intervals to indicate the process of the hydrogenation. The calculated volume of hydrogen required for reduction of the $\Delta^{16}$ double bond was 675 ml. at 20° C./760 mm. At the end of the hydrogenation the catalyst was filtered off and washed and the filtrates evaporated to dryness. The melting point of the crude product was within the range 144–148° C. indicating good quality pregnenolone acetate, without further purification. The following three results show the automatic cessation of hydrogenation after saturation of the $\Delta^{16}$ bond to produce a relatively pure pregnenolone acetate.

TOLUENE 50 ML.

[(i) 21.5° C., 764 mm.]

| Time (mins.) | 3 | 8 | 13 | 43 | 83 | 123 | 163 | 178 | 248 |
|---|---|---|---|---|---|---|---|---|---|
| $H_2$ uptake (ml.) | 40 | 80 | 110 | 300 | 480 | 600 | 640 | 660 | 660 |

[(ii) 21.5° C., 767 mm.]

| Time (mins.) | 2 | 12 | 27 | 47 | 67 | 87 | 117 | 132 | [1]18 | [1]20 |
|---|---|---|---|---|---|---|---|---|---|---|
| $H_2$ uptake (ml.) | 20 | 90 | 170 | 250 | 330 | 400 | 490 | 530 | 700 | 700 |

[(iii) 23° C., 774 mm.]

| Time (mins.) | 5 | 20 | 50 | 95 | 170 | 295 | 465 | [1]24 |
|---|---|---|---|---|---|---|---|---|
| $H_2$ uptake (ml.) | 50 | 150 | 260 | 410 | 560 | 670 | 700 | 690 |

[1] Hours.
Crude M.P.: 144–148° C.

By way of comparison similar hydrogenations were carried out in the following solvents commonly used in the hydrogenation of steroids. In each case hydrogenation continued (at a lower rate) after the saturation of the $\Delta^{16}$ double bond.

ETHYL ACETATE (100 ML.) 24° C., 762 MM.

| Time (mins.) | 2 | 7 | 12 | 17 | 27 | 42 | 57 | 72 | 87 | [1]18 |
|---|---|---|---|---|---|---|---|---|---|---|
| $H_2$ uptake (ml.) | 120 | 380 | 560 | 650 | 690 | 700 | 710 | 720 | 740 | 1,010 |

TETRAHYDROFURAN (100 ML.), 20° C., 758 MM.

| Time (mins.) | 5 | 10 | 15 | 20 | 25 | 35 | 100 | 160 | 285 | 450 | [1]24 |
|---|---|---|---|---|---|---|---|---|---|---|---|
| $H_2$ uptake (ml.) | 230 | 430 | 570 | 640 | 660 | 670 | 690 | 700 | 750 | 790 | 1,080 |

ACETIC ACID (100 ML.), 22° C., 772 MM.

| Time (mins.) | 2 | 4 | 6 | 8 | 10 | 30 | 60 | 100 | 175 |
|---|---|---|---|---|---|---|---|---|---|
| $H_2$ uptake (ml.) | 280 | 520 | 650 | 690 | 700 | 750 | 790 | 840 | 950 |

[1] Hours.

*Example 2*

Pregnadienolone acetate (5 g.) was dissolved in benzene (25 ml.) and hydrogenated in the presence of 5% palladised alumina (0.5 g.) as described in Example 1. Hydrogen required 337 ml.

| Time (mins.) | 5 | 10 | 15 | 20 | 25 | 30 | 35 | 40 | 45 | 50 |
|---|---|---|---|---|---|---|---|---|---|---|
| $H_2$ uptake (ml.) | 70 | 130 | 185 | 245 | 275 | 305 | 325 | 335 | 340 | 340 |

Crude M.P.: 146.5–147.5° C.

Example 3

Pregnadienolone acetate (10 g.) was dissolved in a mixture of ethyl acetate (100 ml.) and toluene (20 ml.) and hydrogenated in the presence of 5% palladised alumina (1 g.) as described in Example 1 at 24° C. and 770 mm.

| Time (mins) | 5 | 15 | 20 | 30 | 50 | 60 | 80 | 105 | [1]18 |
|---|---|---|---|---|---|---|---|---|---|
| $H_2$ uptake (ml.) | 100 | 250 | 330 | 430 | 580 | 630 | 660 | 670 | 680 |

[1] Hours.
Crude M.P.: 143–147° C.

Example 4

Hydrogenations of pregnadienolone acetate (10 g.) in toluene (75 ml.) were carried out as described in Example 1 but using as catalyst 10% palladised charcoal (1 g.).

TOLUENE (75 ML.)

[(i) 20° C., 753 mm. Crude M.P.: 145–147° C.]

| Time (mins) | 5 | 10 | 25 | 55 | 70 | 85 | 130 | 180 | [1]8 |
|---|---|---|---|---|---|---|---|---|---|
| $H_2$ uptake (ml.) | 70 | 130 | 290 | 530 | 610 | 660 | 700 | 700 | 690 |

[(ii) 23° C., 755 mm. Crude M.P.: 144–147° C.]

| Time (mins.) | 5 | 40 | 150 | 250 | [1]20 |
|---|---|---|---|---|---|
| $H_2$ uptake (ml.) | 150 | 660 | 700 | 710 | 700 |

[1] Hours.

By way of comparison similar hydrogenations were carried out in methanol and ethyl acetate, both solvents being commonly used in steroid hydrogenations. In both cases a low melting, insufficiently pure crude product was obtained.

METHANOL (300 ml.), 20.5° C., 748 mm.

| Time (mins.) | 5 | 10 | 35 | 85 | [1]7 |
|---|---|---|---|---|---|
| $H_2$ uptake (ml.) | 350 | 570 | 730 | 700 | 710 |

Crude M.P.: 135–145° C.

ETHYL ACETATE (150 ml.), 24° C., 758 mm.

| Time (mins.) | 5 | 10 | 20 | 40 | 50 | 75 | 120 | 180 | [1]7 |
|---|---|---|---|---|---|---|---|---|---|
| $H_2$ uptake (ml.) | 180 | 280 | 450 | 680 | 730 | 760 | 770 | 790 | 820 |

[1] Hours.
Crude M.P.: 132–140° C.

Example 5

Pregnadienolone acetate (27.5 lb.) was dissolved in pure toluene (12.5 gal.) with stirring and charged into a hydrogenator. A slurry of 5% palladised alumina (500 g.) in toluene (5 l.) was added, the contents were heated to 25° C. and hydrogen at 30 lb./sq. in., pressure was introduced. Hydrogen was absorbed with an exothermic reaction until the theoretical uptake of 600 cu. ft. had been reached when no more was absorbed. The resultant pregnenolone acetate was converted without isolation to pregnenolone M.P. 186–190° C.

$[[\alpha_D]_{20}$ 24.9°. Yield 22.7 lb.]

| Time (mins.) | 0 | 10 | 20 | 30 | 40 | 50 |
|---|---|---|---|---|---|---|
| $H_2$ uptake (cu. ft.) | 0 | 200 | 400 | 550 | 600 | 600 |
| Temperature, ° C. | 27 | 36 | 45 | 51 | 51 | 50 |

We claim:
1. A process for the selective hydrogenation at the 16—17 position of a compound selected from the group consisting of $\Delta^{5,16}$-pregnadien-3β-ol-20-one and its lower alkanoic acyl esters which comprises subjecting such compound to hydrogenation in the presence of a solvent selected from the group consisting of benzene and toluene.

2. A process for the selective hydrogenation at the 16—17 position of a compound selected from the group consisting of $\Delta^{5,16}$-pregnadien-3β-ol-20-one and its lower alkanoic acyl esters which comprises subjecting such compound to catalytic hydrogenation in the presence of a solvent selected from the group consisting of benzene and toluene in the presence of a supported palladium catalyst at a pressure between atmospheric and about 50 lb./sq. in.

3. The process of claim 2 in which ethyl acetate is also present as solvent during such hydrogenation.

4. The process of claim 2 in which said supported palladium catalyst is palladized alumina.

5. The process of claim 2 in which said supported palladium catalyst is palladized charcoal.

6. A process for the production of $\Delta^5$-pregnen-3β-ol-20-one acetate which comprises hydrogenating a solution of $\Delta^{5,16}$-pregnadien-3β-ol-20-one acetate in toluene at a pressure of about 30 lb./sq. in. in the presence of about 1 g. of a 5% palladized alumina catalyst per 25 g. of steroid.

No references cited.